(12) United States Patent
Fitzwater et al.

(10) Patent No.: US 12,337,922 B2
(45) Date of Patent: Jun. 24, 2025

(54) SCOOTER FOLDING MECHANISM

(71) Applicant: The Radio Flyer Company, Chicago, IL (US)

(72) Inventors: Jason Fitzwater, Chicago, IL (US); Collin Ostergaard, Chicago, IL (US)

(73) Assignee: The Radio Flyer Company, Chicago, IL (US)

( * ) Notice: Subject to any disclaimer, the term of this patent is extended or adjusted under 35 U.S.C. 154(b) by 247 days.

(21) Appl. No.: 17/962,567

(22) Filed: Oct. 10, 2022

(65) Prior Publication Data

US 2023/0112111 A1     Apr. 13, 2023

Related U.S. Application Data

(60) Provisional application No. 63/253,944, filed on Oct. 8, 2021.

(51) Int. Cl.
*B62K 15/00* (2006.01)
*B62K 3/00* (2006.01)

(52) U.S. Cl.
CPC ............ *B62K 15/006* (2013.01); *B62K 3/002* (2013.01)

(58) Field of Classification Search
CPC .............................. B62K 15/006; B62K 3/002
See application file for complete search history.

(56) References Cited

U.S. PATENT DOCUMENTS

| | | | | | |
|---|---|---|---|---|---|
| 5,337,609 | A | * | 8/1994 | Hsu | B62K 21/24 |
| | | | | | 280/278 |
| 5,440,948 | A | * | 8/1995 | Cheng | B62K 15/006 |
| | | | | | 280/278 |
| 5,492,350 | A | * | 2/1996 | Pan | B62K 15/006 |
| | | | | | 280/278 |
| 5,947,500 | A | * | 9/1999 | McGrane | B62K 15/006 |
| | | | | | 280/287 |
| 6,581,492 | B1 | * | 6/2003 | Chen | B62K 3/002 |
| | | | | | 280/278 |
| 6,880,848 | B2 | * | 4/2005 | Liu | B62K 15/008 |
| | | | | | 280/278 |
| 9,533,730 | B2 | * | 1/2017 | Yu | B62K 19/18 |
| 11,148,747 | B2 | * | 10/2021 | Poupart | B62K 21/12 |
| 11,364,967 | B1 | * | 6/2022 | Owen | B62K 3/002 |
| 12,128,982 | B1 | * | 10/2024 | Kuo | B62K 15/00 |
| 2002/0139217 | A1 | * | 10/2002 | Montague | B62K 21/16 |
| | | | | | 74/493 |
| 2003/0035682 | A1 | * | 2/2003 | Chen | B62K 15/006 |
| | | | | | 403/109.7 |

(Continued)

*Primary Examiner* — Erez Gurari
(74) *Attorney, Agent, or Firm* — Barnes & Thornburg LLP

(57) ABSTRACT

A folding mechanism for a scooter to transition the scooter from a use position to a folded position. The folding mechanism has an upper housing connected to a steering tube of the scooter, and a lower housing operably secured to a fork of the scooter and pivotally secured to the upper housing about a folding axle. A lever is pivotally attached to the folding axle and operates to move a locking clamp from an unlocked position to a locked position. The locking connects the upper housing and the lower housing in the locked position. Additionally, a locking sleeve engages the lever to prevent the lever from being moved from the locked position to the unlocked position when the locking sleeve is in its locked position.

20 Claims, 10 Drawing Sheets

(56) References Cited

U.S. PATENT DOCUMENTS

| | | | | |
|---|---|---|---|---|
| 2009/0057505 | A1* | 3/2009 | Chen | B62K 21/24 |
| | | | | 248/185.1 |
| 2014/0356050 | A1* | 12/2014 | Yu | B62K 19/18 |
| | | | | 403/110 |
| 2015/0042065 | A1* | 2/2015 | Wang | B62K 15/008 |
| | | | | 280/287 |
| 2021/0179214 | A1* | 6/2021 | Sela | B62K 15/00 |
| 2022/0033029 | A1* | 2/2022 | Wang | B62K 21/16 |
| 2022/0055710 | A1* | 2/2022 | Zhou | B62K 15/00 |
| 2022/0106006 | A1* | 4/2022 | Boutakis | B62M 9/127 |
| 2022/0185417 | A1* | 6/2022 | Chiu | B62K 5/003 |
| 2022/0234673 | A1* | 7/2022 | Wang | B62K 15/006 |
| 2023/0358260 | A1* | 11/2023 | Wen | F16B 7/0426 |
| 2024/0101215 | A1* | 3/2024 | Wu | B62K 15/006 |

\* cited by examiner

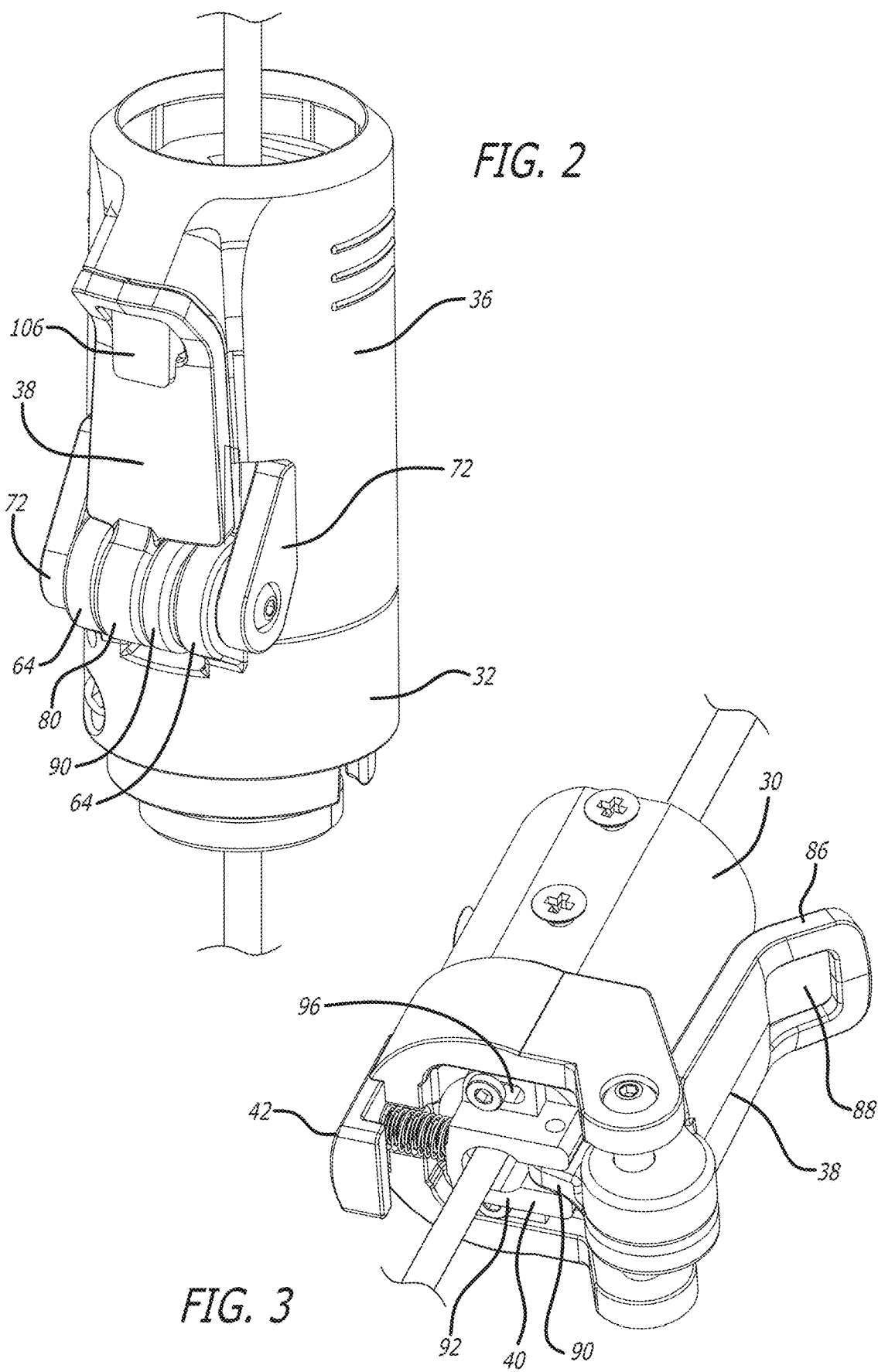

SCOOTER FOLDING MECHANISM

CROSS-REFERENCE TO RELATED APPLICATIONS

This application claims the benefit of U.S. Provisional Patent Application No. 63/253,944 filed Oct. 8, 2021, which is expressly incorporated herein by reference and made a part hereof.

FEDERALLY SPONSORED RESEARCH OR DEVELOPMENT

Not Applicable.

TECHNICAL FIELD

The present subject matter relates to scooters, and more particularly, to scooters having a folding assembly to transition the scooter between a use and stowed position.

BACKGROUND

Folding scooters are known in the art. While such products according to the prior art provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a folding mechanism for a scooter to transition the scooter from a use position to a folded position.

The disclosed technology further relates to a folding mechanism for a scooter to transition the scooter from a use position to a folded position, comprising: an upper housing connected to a steering tube of the scooter; a lower housing secured to a fork of the scooter, the lower housing also being pivotally secured to the upper housing about a folding axle; a lever pivotally attached to the folding axle, the lever operating a locking clamp that moves from a locked position to an unlocked position, the locking clamp engaging both the upper housing and the lower housing in the locked position; and, a locking sleeve that slides linearly about the upper housing from an unlocked position to a locked position, the locking sleeve engaging the lever to prevent the lever from being moved from the locked position to the unlocked position when the locking sleeve is in its locked position.

The disclosed technology further relates to a folding mechanism for a scooter to transition the scooter from a use position to a folded position, comprising: an upper housing connected to a steering tube of the scooter; a lower housing operably connected to a fork of the scooter, the lower housing also being pivotally secured to the upper housing about a folding axle; a first lock fixedly securing the lower housing to the upper housing and preventing the upper housing from pivoting with respect to the lower housing when the first lock is in the locked position; and, a second lock moving from a locked position to an unlocked position, the second lock preventing the first lock from moving out of the locked position when the second lock is in the locked position.

The disclosed technology further relates to a folding mechanism for a scooter to transition the scooter from a use position to a folded position, comprising: an upper housing connected to a steering tube of the scooter; a lower housing secured to a fork of the scooter, the lower housing also being pivotally secured to the upper housing about a folding axle; a lever pivotally attached to the folding axle; a locking clamp connected to the lever, the locking clamp having a first mating member that engages the upper housing and a second mating that engages the lower housing to lock the upper housing to the lower housing in a first position, wherein when the lever is pivoted away from the upper housing to a second position the locking clamp moves to a second position where the first mating member disengages from the upper housing and the second mating member disengages from the lower housing to allow the upper housing to pivot with respect to the lower housing to fold the scooter.

The disclosed technology further relates to a folding mechanism further comprising a release member connecting the lever and the locking clamp, and also comprising a spring to bias the locking clamp to the unlocked position.

The disclosed technology further relates to a folding mechanism wherein the lever has a cam shoulder extending therefrom, wherein the release member has a ring portion with an opening in which the cam shoulder is fitted.

The disclosed technology further relates to a folding mechanism wherein the cam shoulder is offset to allow for linear motion of the of the locking clamp connected to the release member when the lever is pivoted.

The disclosed technology further relates to a folding mechanism wherein the locking clamp has a first mating member that engages a receiver in the upper housing and a second mating member that engages a different receiver in the lower housing to lock the upper housing to the lower housing in a first position.

The disclosed technology further relates to a folding mechanism wherein the locking sleeve has a protrusion that extends through an opening in the lever when the locking sleeve is in the locked position.

The disclosed technology further relates to a folding mechanism wherein the locking sleeve is positioned around the steering tube and can translate axially about the steering tube.

The disclosed technology further relates to a folding mechanism wherein the first lock comprises a lever pivotally attached to the folding axle, the lever operating a locking clamp that moves from a locked position to an unlocked position, the locking clamp engaging both the upper housing and the lower housing in the locked position.

The disclosed technology further relates to a folding mechanism wherein the second lock comprises a locking sleeve that slides linearly about the upper housing from an unlocked position to a locked position, the locking sleeve engaging a lever to prevent the lever from being pivoted in a locked position when the locking sleeve is in its locked position.

The disclosed technology further relates to a folding mechanism wherein the lever has a cam shoulder extending therefrom, wherein the release member has a ring portion with an opening in which the cam shoulder is fitted, and wherein pivoting of the lever causes linear motion of the locking clamp connected to the release member.

The disclosed technology further relates to a folding mechanism further comprising a locking sleeve that slides linearly about the steering tube from an unlocked position to a locked position, the locking sleeve engaging the lever in its locked position to prevent the lever from being pivoted away from the upper housing when the locking sleeve is in its locked position.

The disclosed technology further relates to a folding mechanism further comprising a release member connecting the lever and the locking clamp, and also comprising a spring to bias the locking clamp to the second position.

The disclosed technology further relates to a folding mechanism wherein the lever has a cam shoulder extending therefrom, wherein the release member has a ring portion with an opening in which the cam shoulder is fitted, and wherein pivoting of the lever causes linear motion of the locking clamp connected to the release member.

The disclosed technology further relates to a folding mechanism wherein the release member comprises a ring portion and a slide portion, wherein the ring portion is pivotally connected to the slide portion, wherein the locking clamp is connected to the slide portion, and wherein the cam shoulder is connected to the ring portion.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings:

FIG. 2 is a rear perspective view of a folding mechanism for the scooter of FIG. 1, shown in a first or use mode.

FIG. 3 is a bottom perspective view of the upper folding housing of the folding mechanism of FIG. 1.

Figure 1:
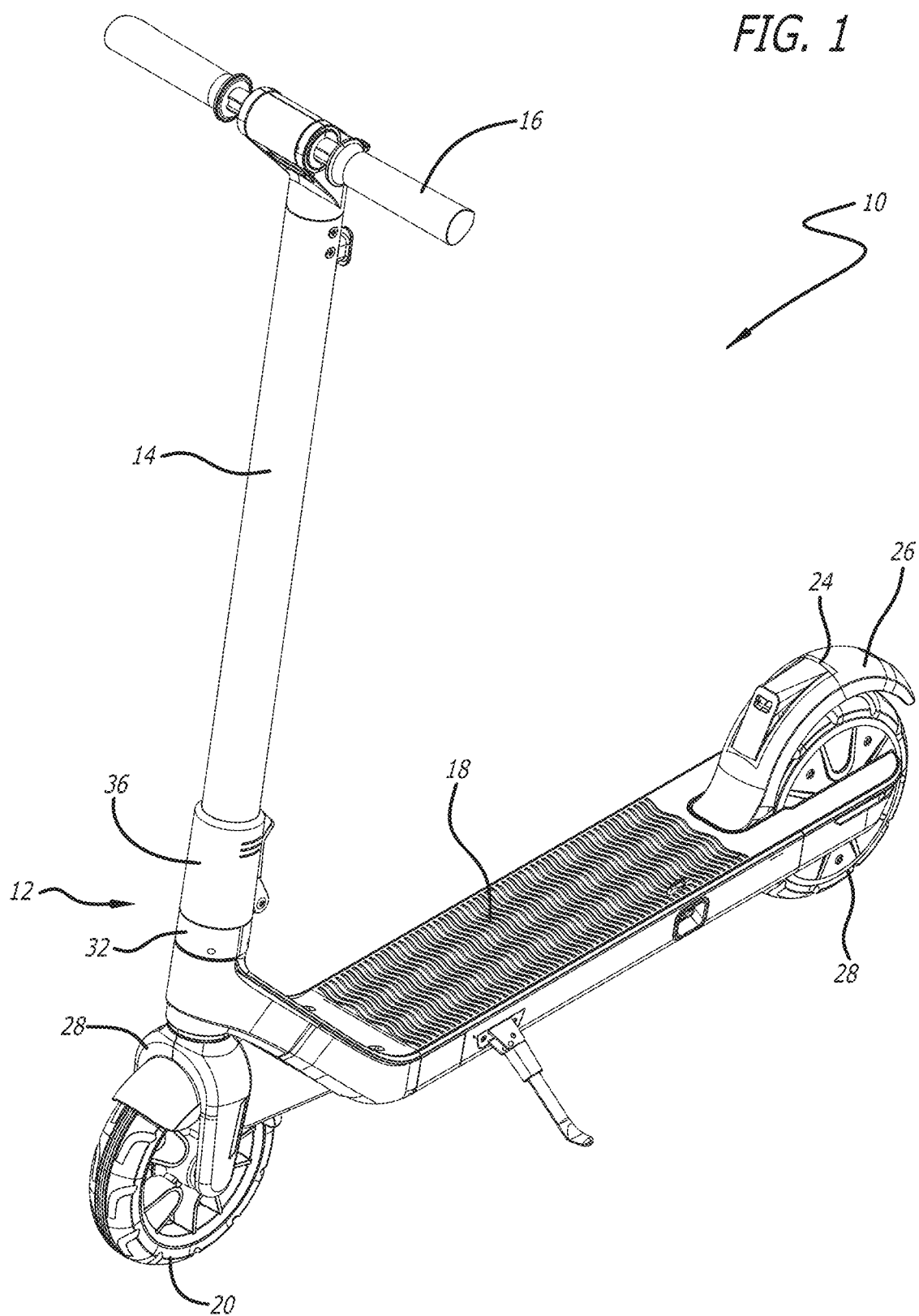
FIG. 1 is a front perspective view of a scooter with a folding mechanism according to the present disclosure, shown in its environment of use in a first or use mode.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Figure 10:
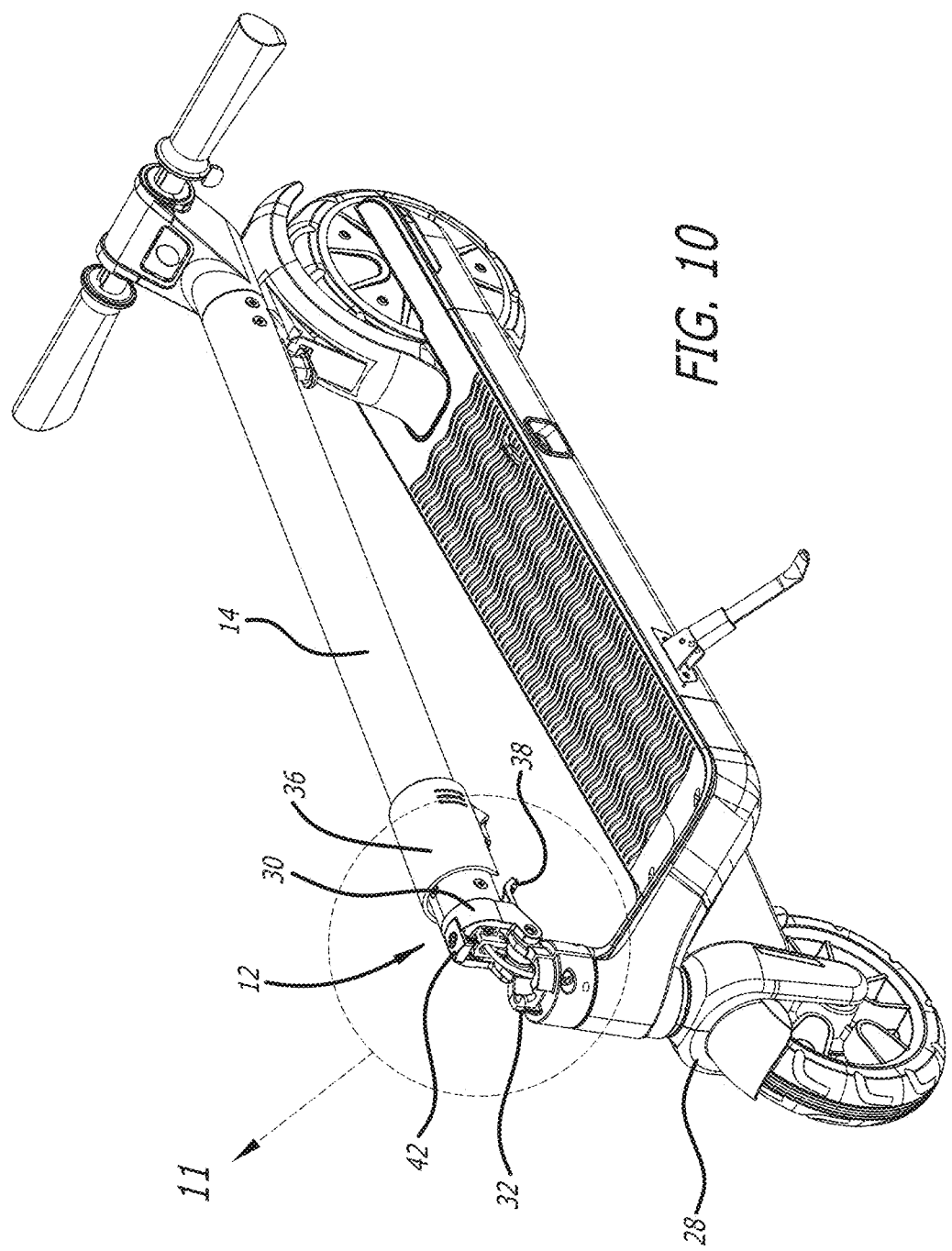
FIG. 10 is a perspective view of a scooter with a folding mechanism according to the present disclosure, shown in its environment of use in a second, folded or stowed mode.

Generally, this disclosure describes various embodiments of scooter 10 with a folding mechanism 12 to allow the scooter 10 to transition from a first or use position, as shown in FIG. 1, to a second or folded position, as shown in FIG. 10. Referring now to the figures, and initially to FIG. 1, there is shown an embodiment of a scooter 10 with a folding mechanism 12. In various implementations, the scooter 10 includes a handlebar 16, a steering tube 14, a deck 18, a fork 28, a front wheel 20 connected to the fork 28, and a rear wheel 22. In one embodiment the scooter 10 may have a motor, such as an electric motor, gas motor or other powered motor. The scooter 10 may also have a brake assembly 24 operable by a user to slow the scooter 10. In one embodiment the brake assembly 24 may be a mechanical brake system that operates to slow the scooter 10 by frictionally engaging a brake pad with the rear wheel 22 when the user pushes down on the rear fender 26 of the scooter 10.

Figure 4:
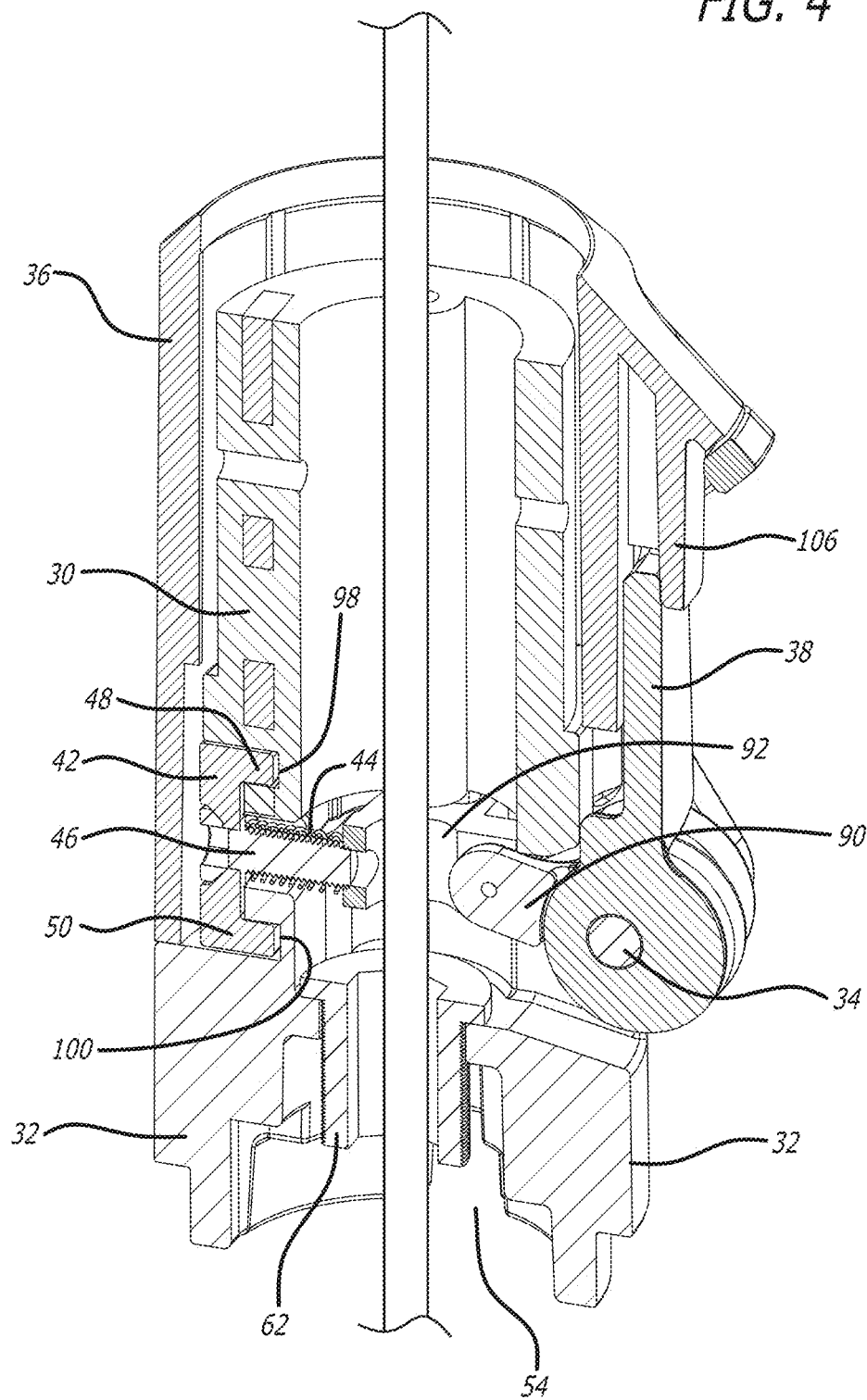
FIG. 4 is cross sectional view of the folding mechanism of FIG. 1, shown in the first or use mode.
Figure 5:
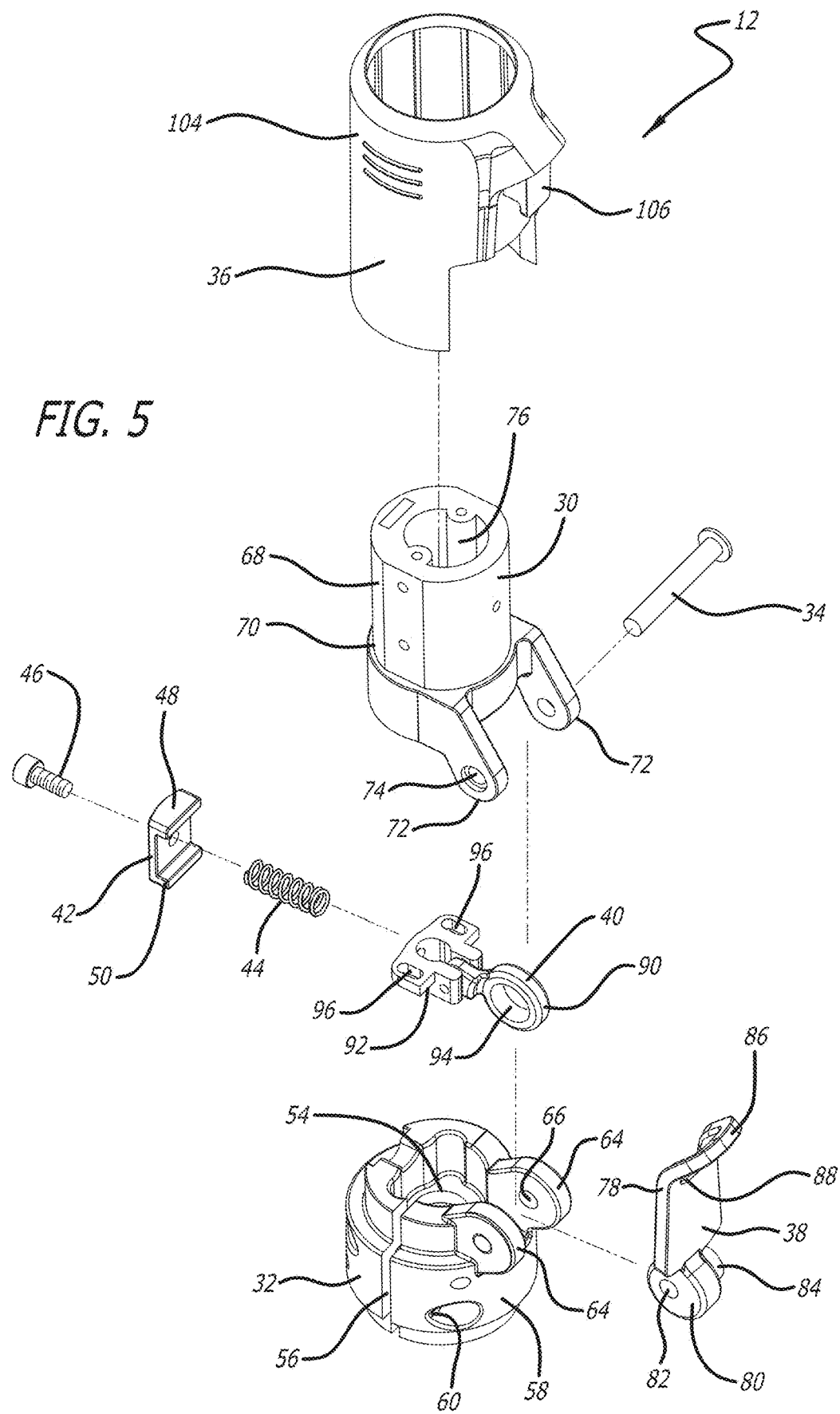
FIG. 5 is an exploded perspective view of the folding mechanism of FIG. 1.

As show in FIGS. 4 and 5, in one embodiment, the folding mechanism 12 comprises an upper housing 30, a lower housing 32 pivotally secured to the upper housing 30 about a folding axle 34, a locking sleeve 36, a collar lever 38, a release member 40, a locking clamp 42, a spring 44 and a bolt 46. The upper housing 30 is secured to the steering tube 14 of the scooter 10, as shown in FIGS. 6-9, and the lower housing 32 is secured to the fork 28 as shown in FIGS. 6-9. The locking clamp 42 has a first mating member 48 that engages the upper housing 30 and a second mating 50 that engages the lower housing 32 to lock the upper housing 30 to the lower housing 32 in the first position.

Referring to FIGS. 4 and 5, the lower housing 32 is a clamp member that has a generally central opening 54 and a slot 56 extending from an outer surface 58 of the lower housing 32 through to the opening 54. The lower housing 32 also has a fastener 60. During assembly, a portion of the fork 28 is positioned in the opening 54 and the fastener 60 is used to squeeze the slot 56 and secure, in a clamping manner, the lower housing 32 to the fork 28. A second fastener 62 that is screwed to the fork 28 is used to further secure the lower housing 32 to the fork 28. Accordingly, since the fork 28 is secured to the lower housing 32 the fork 28 therefore rotates with the lower housing 32. The lower housing 32 also has a pair of tabs 64 that assist in pivotally securing the upper housing 30 to the lower housing 32. In one embodiment, the tabs 64 extend generally outwardly and angularly upward. The tabs 64 have an aperture 66 to receive the folding axle 34.

Figure 11:
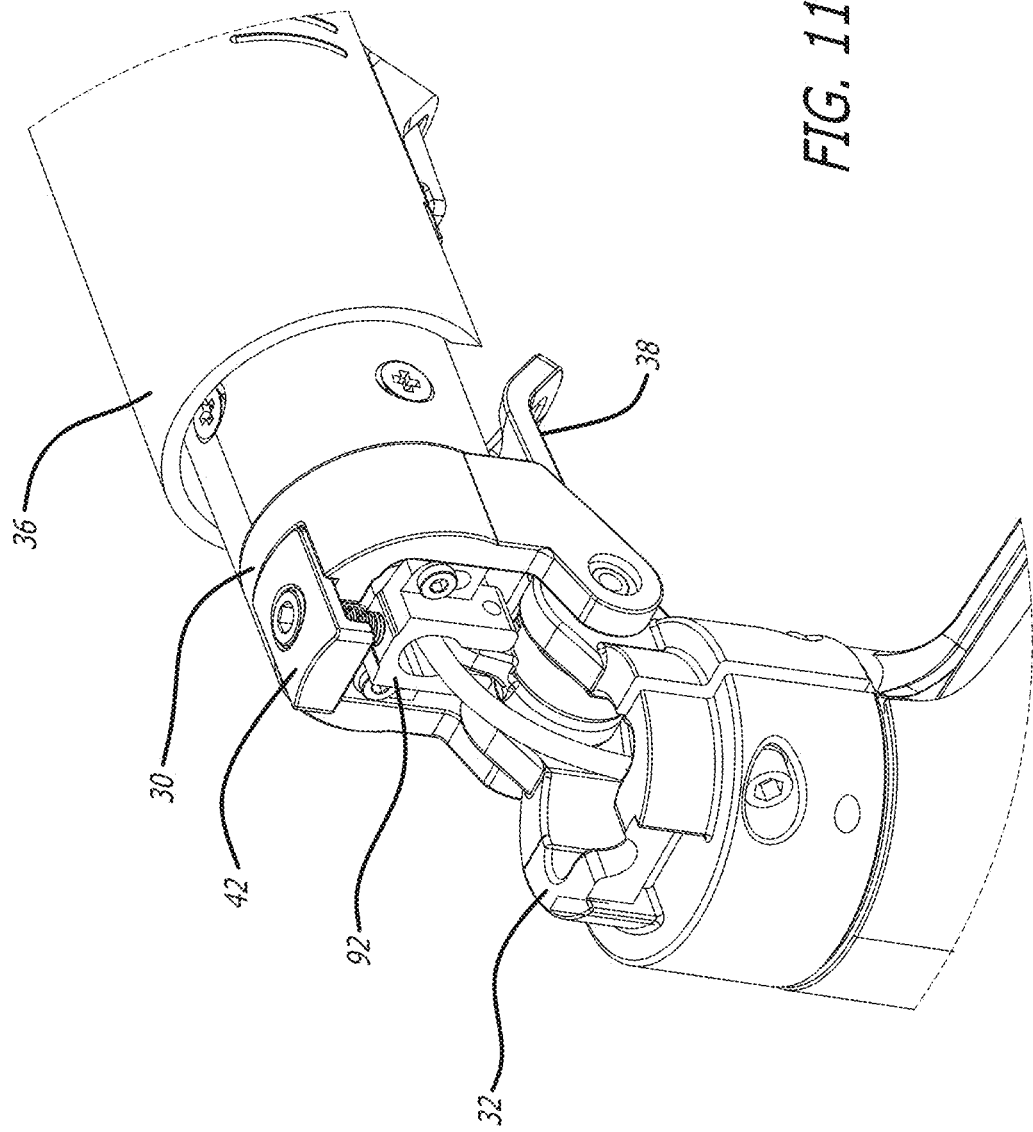
FIG. 11 is an enlarged perspective view of a scooter with a folding mechanism according to the present disclosure, shown in its environment of use in a second, folded or stowed mode.

The upper housing 30 has a top portion 68 that secures to the steering tube 14 via a plurality of fasteners. Specifically, in one embodiment, the steering tube 14 is fitted around the top portion 68 of the upper housing 30 and is fastened to the upper housing 30 so that the upper housing 30 turns with the steering tube 14 as the user turns the handlebar 16 to operate the scooter 10. The upper housing 30 also has a shoulder 70 that operates as a stop for the steering tube 14 to properly seat the steering tube 14 on the upper housing 30. In one embodiment, the upper housing 30 also has a pair of tabs 72 that extend generally outwardly and angularly downward. The tabs 72 have an aperture 74 to receive the folding axle 34. As shown in FIG. 2, in one embodiment, the tabs 72 of the upper housing 30 are positioned outwardly of the tabs 64 of the lower housing 32 on the folding axle 34. Accordingly, the upper housing 30 is able to pivot about the folding axle 34 with respect to the lower housing 32 to fold the scooter 10 as shown in FIGS. 10 and 11. The upper housing 30 also has a generally central opening 76 in a preferred embodiment.

As shown in FIGS. 3-5, in one embodiment, the release member 40 and the collar lever 38 are also connected to the folding axle 34. In one embodiment, collar lever 38 comprises an elongated portion 78 and a hub 80. The hub 80 has an aperture 82 to receive the folding axle 34. In one embodiment, as shown in FIG. 4, the aperture 82 is offset from a center of the hub 80. Additionally, in one embodiment, the hub 80 also has a cam shoulder 84 extending from a side thereof. As explained herein, a portion of the release member 40 is fitted around the cam shoulder 84 of the collar lever 38. As shown in FIG. 3, the distal end 86 of the elongated portion 78 extends at an angle thereto and also has an opening 88.

In one embodiment, the release member 40 comprises a ring portion 90 and a slide portion 92. In one embodiment, the ring portion 80 is pivotally connected to the slide portion 92 as shown in FIG. 3. The ring portion 90 has an opening 94 in which the cam shoulder 84 of the collar lever 8 is fitted. The slide portion 92 is slidingly secured to an underside of the upper housing 30, also as shown in FIG. 3. The slide portion 92 has a plurality of slots 96 through which fasteners extend to secure the slide portion 92 to the upper housing 30, but which also allow the slide portion 92 to move linearly with respect to the upper housing 30. The locking clamp 42 is secured to the slide portion 92 of the release member 40 via the bolt 46. Additionally, a spring 44, such as a compression spring, is positioned on the bolt 46 between the slide portion 92 and the locking clamp 42 to bias the locking clamp 42 away from the slide portion 92. In a first position of the release member 40 the first mating member 48 of the locking clamp 42 engages a receiver 98 in the upper housing 30 and a second mating 50 engages a receiver 100 in the lower housing 32 to lock the upper housing 30 to the lower housing 32 in the first position. In one embodiment, the receivers 98, 100 comprise an undercut or groove.

Figure 6:
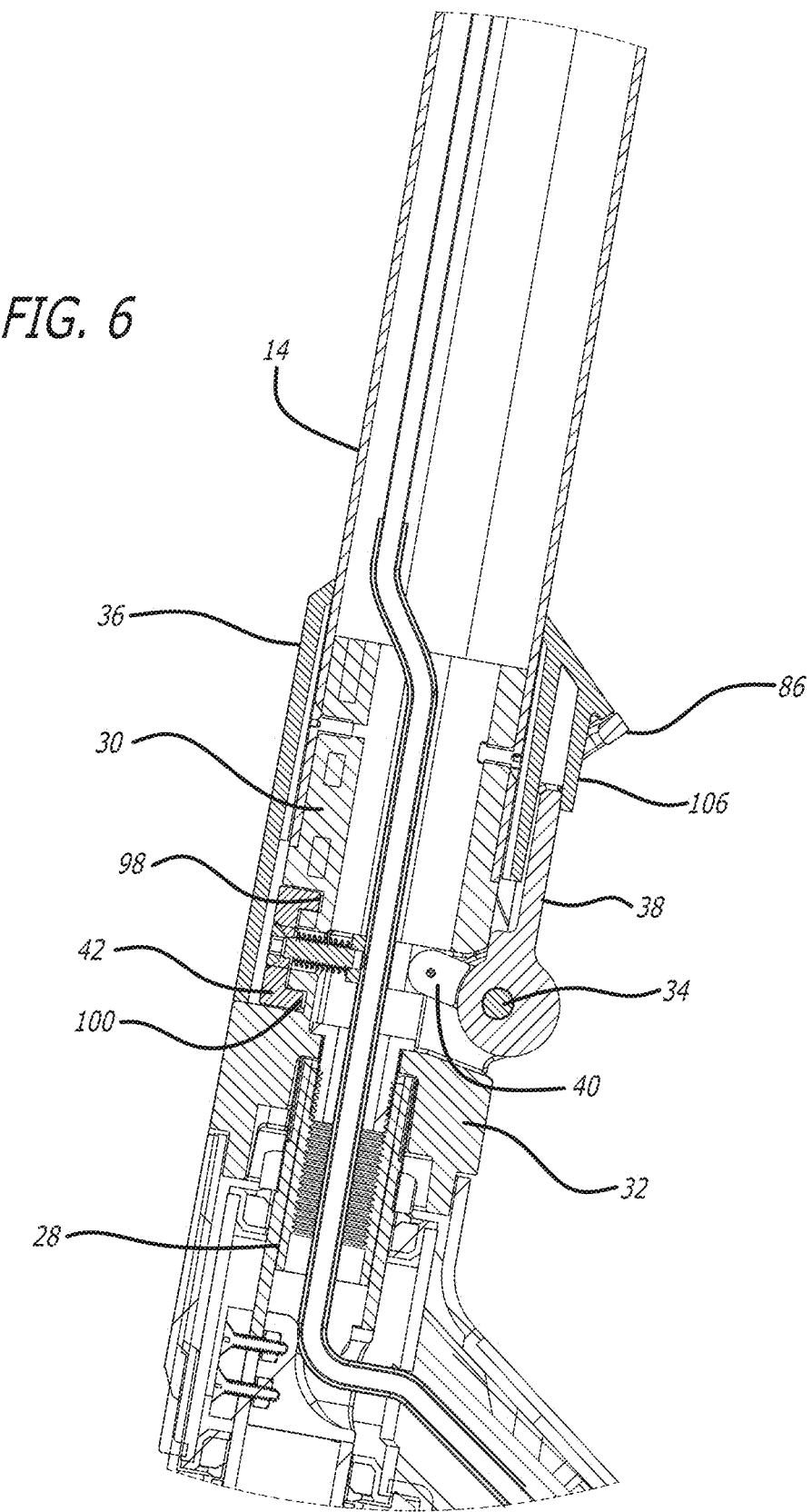
FIG. 6 is a cross-sectional view of the scooter and folding mechanism of FIG. 1, shown in a first or use mode.
Figure 7:
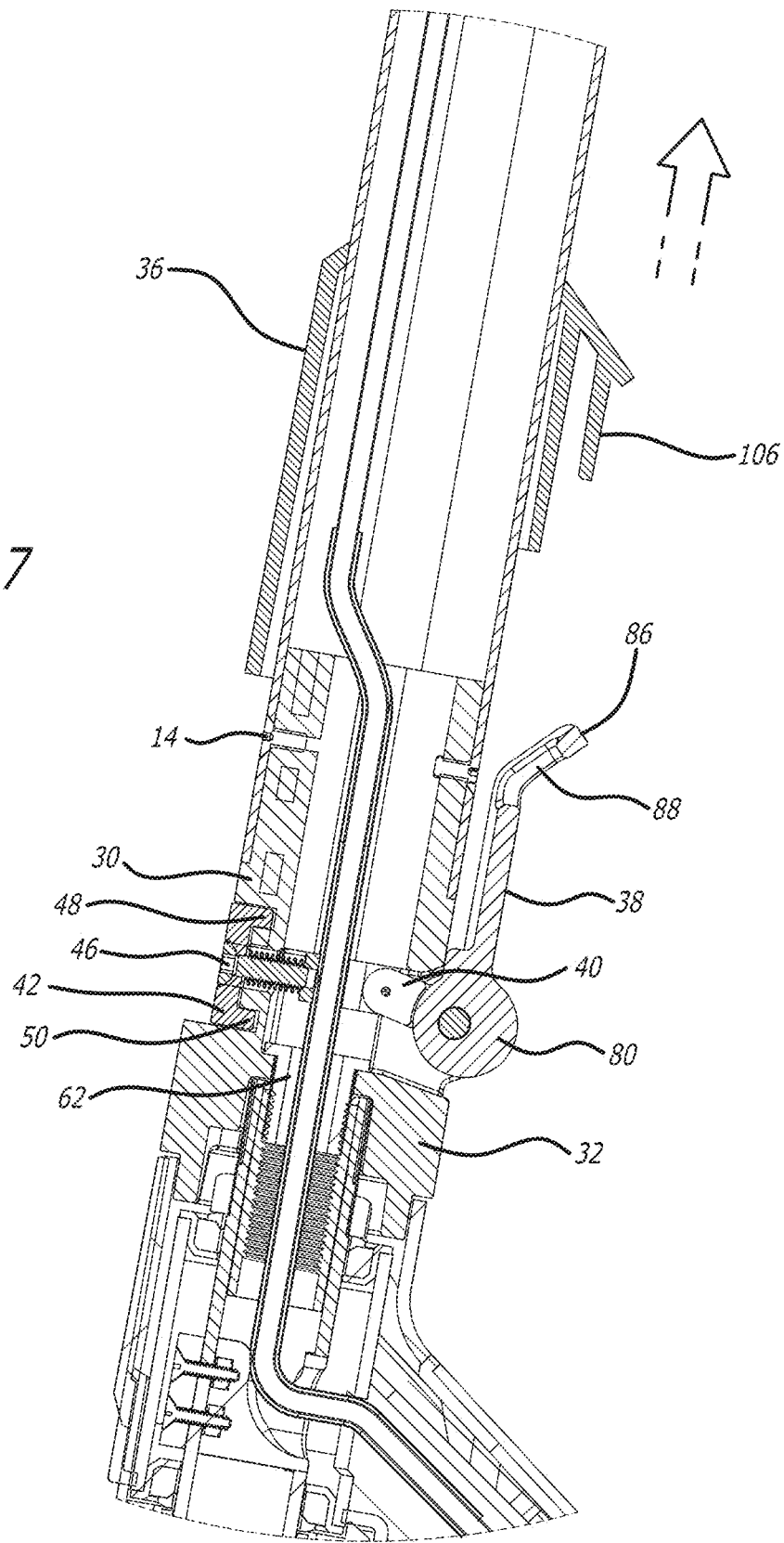
FIG. 7 is a cross-sectional view of the scooter and folding mechanism of FIG. 1, shown with the folding mechanism in a first transition state between the first mode and the second or folded mode.
Figure 8:
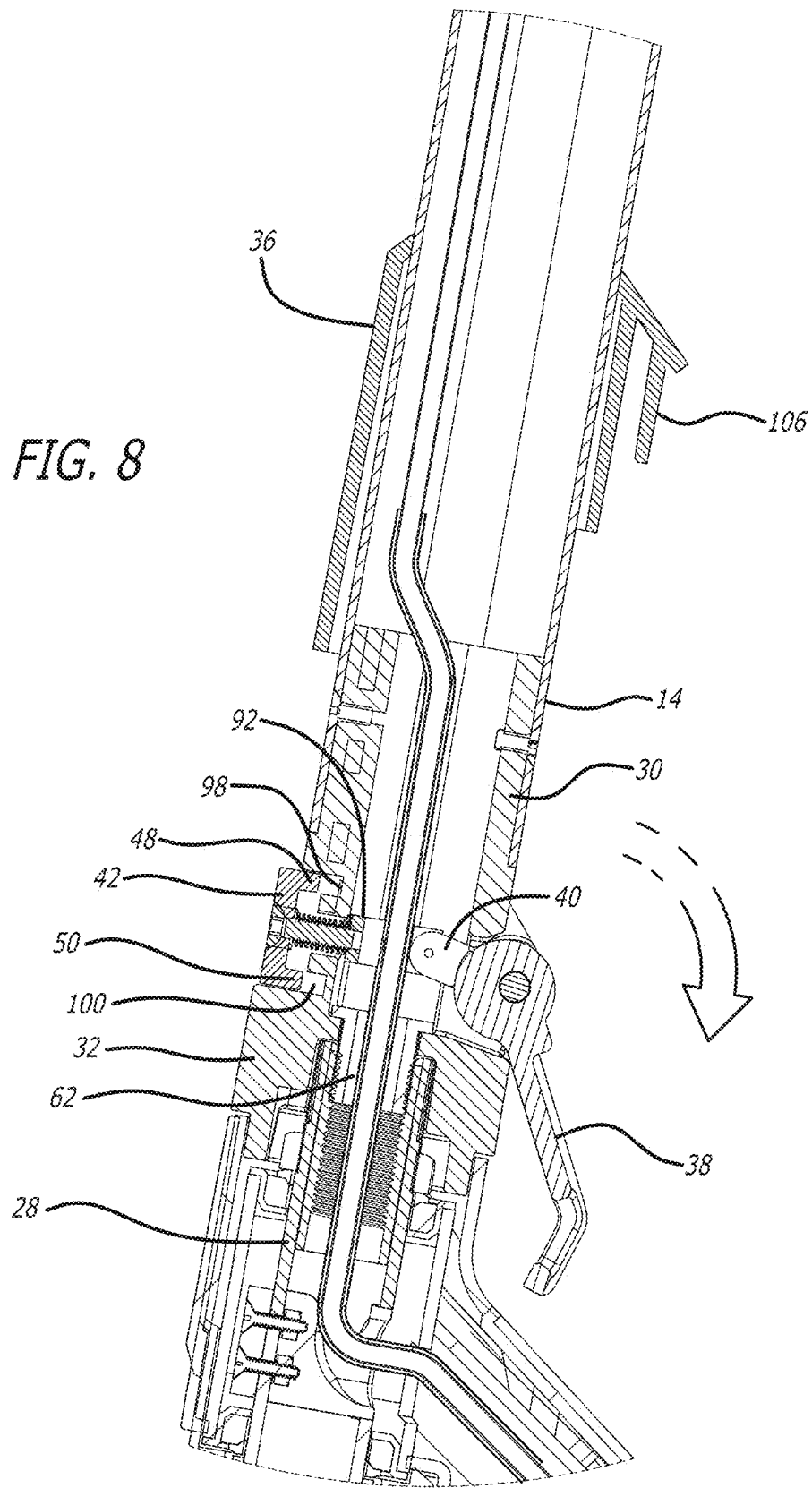
FIG. 8 is a cross-sectional view of the scooter and folding mechanism of FIG. 1, shown with the folding mechanism in a second transition state between the first mode and the second or folded mode.

Because the ring portion 90 is positioned around the cam shoulder 84 of the collar lever 38, and because the cam shoulder 84 of the collar lever 38 is offset from the opening 82 in the hub 80 of the collar lever 38, when the collar lever 38 is pivoted from its locked position (see FIG. 7) to its unlocked position (see FIG. 8), the cam shoulder 84 operates to move the release member 40 and locking clamp 42. In one embodiment, when the collar lever 38 is pivoted downwardly, the release member 40 moves from a first position as shown in FIGS. 6 and 7, to a second position as shown in FIG. 8. away from the collar lever 38 and toward a front of the scooter 10 to release the locking clamp 42 from engagement with the upper housing 30 and the lower housing 32. The spring 44 assists in disengaging the locking clamp 42 from the receivers 98, 100 of the upper housing 30 and lower housing 32 by biasing the locking clamp 42 away from the upper and lower housings 30, 32.

Thus, in one embodiment, to transition the scooter 10 from the first or use position as shown in FIG. 1 to the second or folded position as shown in FIG. 10, the collar lever 38 is moved downwardly to release the locking clamp 42 from engagement with the upper and lower housings 30, 32. The user can then pivot the handlebar 16 and connected steering tube 14 downwardly toward the deck 18 of the scooter 10. The upper housing 30 pivots with respect to the lower housing 32 about the axle 34.

Conversely, to transition the scooter 10 from the second or folded position shown in FIG. 10 to the first or use position shown in FIG. 1, the user pivots the handlebar 16 and connected steering tube 14 upwardly toward the use position. When the upper housing 30 is properly pivoted to its final use position on the lower housing 32 the user pivots the collar lever 38 upward toward the steering column 14. When the collar lever 38 is pivoted upward the cam shoulder 84 of the collar lever 38 will operate to pull the release member 40 toward the axle 34 and against the bias of the spring 44. The locking clamp 42 will once again engage both the upper housing 30 and the lower housing 32 to lock the two components in place and lock the steering tube 14 in the upright or use position.

In one embodiment, a second lock feature, also referred to as a safety lock, is provided. In one embodiment, the second lock feature comprises the locking sleeve 36 that engages the collar lever 38 to prevent the locking collar 38 from being pivoted from its locked position as shown in FIGS. 2 and 6 until the locking sleeve 36 is moved axially away from the collar lever 38 as shown in FIG. 7.

Figure 9:
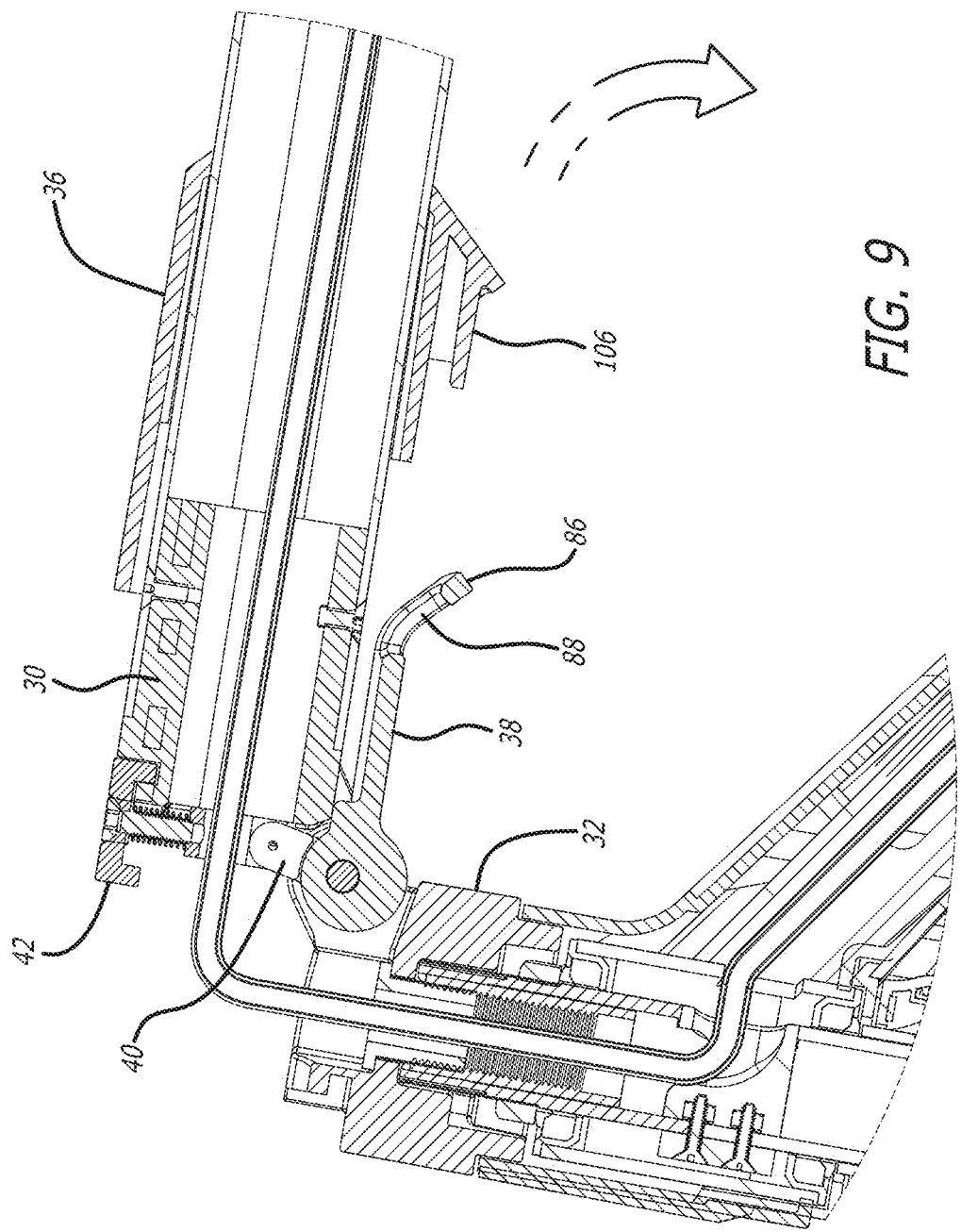
FIG. 9 is a cross-sectional view of the scooter and folding mechanism of FIG. 1, shown with the folding mechanism in the second or folded mode.

As shown in FIGS. 2, 4 and 5, in one embodiment the locking sleeve 36 generally comprises a tubular member 104 with a downward protrusion 106. The locking sleeve 36 is fitted around the steering tube 14 and upper housing member 30 and can translate axially about the steering tube 14. As shown in FIGS. 2, 4 and 6, when the locking sleeve 36 is in its locked position the protrusion 106 of the locking sleeve 36 extends through the opening 88 in the distal end 86 of the elongated portion 78 of the collar lever 38. Because the protrusion 106 extends through the opening 88 of the collar lever 38, the collar lever 38 is prevented from being pivoted away from the steering tube 14 to release the locking clamp 42. Thus, to be able to pivot the collar lever 38 downwardly to release the locking clamp 42 the user must first slide the locking sleeve 36 upwardly, as shown in FIG. 7, to remove the protrusion 106 from the opening 88 in the collar lever 38. When the protrusion 106 is removed from the opening 88 the user is then able to pivot the collar lever 38 downwardly as shown in FIG. 8. Once the collar lever 38 is pivoted downwardly and the locking clamp 42 is disengaged from the upper and lower housings 30, 32 the steering tube 14 can be pivoted downwardly toward the deck 18 of the scooter as shown in FIG. 9.

As shown in FIGS. 6-9 and 11, all of the electrical wires and other tubing are able to extend through the center of the steering tube, upper housing 30, release member 40, and lower housing 32 when the steering tube 14 is in the use position and the folded position.

The embodiments detailed hereinabove may be combined in full or in part, with any alternative embodiments described.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the present disclosure may be embodied in other specific forms without departing from the spirit or central characteristics thereof. The present examples and embodiments, therefore, are to be considered in all respects as illustrative and not restrictive, and the Claims are not to be limited to the details given herein. Accordingly, while the specific embodiments have been illustrated and described, numerous modifications come to mind without significantly departing from the spirit of the disclosure and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A folding mechanism for a scooter to transition the scooter from a use position to a folded position, comprising:
   an upper housing connected to a steering tube of the scooter;
   a lower housing secured to a fork of the scooter, the lower housing also being pivotally secured to the upper housing about a folding axle;
   a lever pivotally attached to the folding axle, the lever operating a locking clamp that moves from a locked position to an unlocked position, the locking clamp engaging both the upper housing and the lower housing in the locked position; and,
   a locking sleeve that slides linearly about the upper housing from an unlocked position to a locked position, the locking sleeve engaging the lever to prevent the lever from being moved from the locked position to the unlocked position when the locking sleeve is in its locked position.

2. The folding mechanism of claim 1, further comprising a release member connecting the lever and the locking clamp, and also comprising a spring to bias the locking clamp to the unlocked position.

3. The folding mechanism of claim 2, wherein the lever has a cam shoulder extending therefrom, wherein the release member has a ring portion with an opening in which the cam shoulder is fitted.

4. The folding mechanism of claim 3, wherein the cam shoulder is offset to allow for linear motion of the of the locking clamp connected to the release member when the lever is pivoted.

5. The folding mechanism of claim 1, wherein the locking clamp has a first mating member that engages a receiver in the upper housing and a second mating member that engages a different receiver in the lower housing to lock the upper housing to the lower housing in a first position.

6. The folding mechanism of claim 1, wherein the locking sleeve has a protrusion that extends through an opening in the lever when the locking sleeve is in the locked position.

7. The folding mechanism of claim 1, wherein the locking sleeve is positioned around the steering tube and can translate axially about the steering tube.

8. A folding mechanism for a scooter to transition the scooter from a use position to a folded position, comprising:
   an upper housing connected to a steering tube of the scooter;
   a lower housing operably connected to a fork of the scooter, the lower housing also being pivotally secured to the upper housing about a folding axle;
   a first lock fixedly securing the lower housing to the upper housing and preventing the upper housing from pivoting with respect to the lower housing when the first lock is in the locked position; and,
   a second lock moving from a locked position to an unlocked position, the second lock preventing the first lock from moving out of the locked position when the second lock is in the locked position.

9. The folding mechanism of claim 8, wherein the first lock comprises a lever pivotally attached to the folding axle, the lever operating a locking clamp that moves from a locked position to an unlocked position, the locking clamp engaging both the upper housing and the lower housing in the locked position.

10. The folding mechanism of claim 8, wherein the second lock comprises a locking sleeve that slides linearly about the upper housing from an unlocked position to a locked position, the locking sleeve engaging a lever to prevent the lever from being pivoted in a locked position when the locking sleeve is in its locked position.

11. The folding mechanism of claim 9, further comprising a release member connecting the lever and the locking clamp, and also comprising a spring to bias the locking clamp to the unlocked position.

12. The folding mechanism of claim 11, wherein the lever has a cam shoulder extending therefrom, wherein the release member has a ring portion with an opening in which the cam shoulder is fitted, and wherein pivoting of the lever causes linear motion of the locking clamp connected to the release member.

13. The folding mechanism of claim 9, wherein the locking clamp has a first mating member that engages a receiver in the upper housing and a second mating member that engages a different receiver in the lower housing to lock the upper housing to the lower housing in a first position.

14. The folding mechanism of claim 10, wherein the locking sleeve has a protrusion that extends through an opening in the lever when the locking sleeve is in the locked position.

15. A folding mechanism for a scooter to transition the scooter from a use position to a folded position, comprising:
   an upper housing connected to a steering tube of the scooter;

a lower housing secured to a fork of the scooter, the lower housing also being pivotally secured to the upper housing about a folding axle;

a lever pivotally attached to the folding axle;

a locking clamp connected to the lever, the locking clamp having a first mating member that engages the upper housing and a second mating that engages the lower housing to lock the upper housing to the lower housing in a first position, wherein when the lever is pivoted away from the upper housing to a second position the locking clamp moves to a second position where the first mating member disengages from the upper housing and the second mating member disengages from the lower housing to allow the upper housing to pivot with respect to the lower housing to fold the scooter.

16. The folding mechanism of claim 15, further comprising a locking sleeve that slides linearly about the steering tube from an unlocked position to a locked position, the locking sleeve engaging the lever in its locked position to prevent the lever from being pivoted away from the upper housing when the locking sleeve is in its locked position.

17. The folding mechanism of claim 16, wherein the locking sleeve has a protrusion that extends through an opening in the lever when the locking sleeve is in the locked position.

18. The folding mechanism of claim 15, further comprising a release member connecting the lever and the locking clamp, and also comprising a spring to bias the locking clamp to the second position.

19. The folding mechanism of claim 18, wherein the lever has a cam shoulder extending therefrom, wherein the release member has a ring portion with an opening in which the cam shoulder is fitted, and wherein pivoting of the lever causes linear motion of the locking clamp connected to the release member.

20. The folding mechanism of claim 18, wherein the release member comprises a ring portion and a slide portion, wherein the ring portion is pivotally connected to the slide portion, wherein the locking clamp is connected to the slide portion, and wherein the cam shoulder is connected to the ring portion.

* * * * *